United States Patent [19]

Widmer et al.

[11] 4,288,034

[45] Sep. 8, 1981

[54] BOOM SHOCK AND TILT SYSTEM

[75] Inventors: Gerald L. Widmer, Loda, Ill. 60948; Larry J. Gray, Loda; Richard H. Pardee, Springfield, both of Ill.

[73] Assignee: Gerald Widmer, Paxton, Ill.

[21] Appl. No.: 21,993

[22] Filed: Mar. 19, 1979

[51] Int. Cl.³ .............................................. B05B 1/20
[52] U.S. Cl. ..................................... 239/168; 239/159
[58] Field of Search ............... 239/159, 163, 166–168; 293/129

[56] References Cited

U.S. PATENT DOCUMENTS

| | | | |
|---|---|---|---|
| 3,544,009 | 12/1970 | Schlueter | 239/167 |
| 3,807,676 | 4/1974 | Bieker et al. | 239/167 X |
| 3,861,729 | 1/1975 | Williams | 239/129 |
| 3,972,476 | 8/1976 | Hall | 239/167 |

FOREIGN PATENT DOCUMENTS

1019295  1/1953  France ........................... 239/167

*Primary Examiner*—Robert W. Saifer
*Attorney, Agent, or Firm*—Lockwood, Dewey, Alex & Cummings

[57] ABSTRACT

A vehicle mounted spray boom assembly includes a breakaway spray boom and shock absorbing means for absorbing the shock on the boom assembly when a boom returns to normal position after striking an obstacle. The shock absorbing means includes a swing cylinder for rigging in and rigging out the spray boom and a tilt cylinder for tilting the boom when the boom has been rigged out. Upon occurrence of shock after an obstacle is struck, a portion of the hydraulic fluid in the swing cylinder is forced into the tilt cylinder to lift the spray boom to dissipate the shock. In addition, another cylinder may be provided for absorbing shock imparted to the boom due to vertical movement of the boom. Also the swing cylinder and tilt cylinder are hydraulically connected in parallel so that when rig out has been completed, pressurized hydraulic fluid continues to be ported to the tilt cylinder to elevate the end of the boom.

24 Claims, 5 Drawing Figures

BOOM SHOCK AND TILT SYSTEM

BACKGROUND AND SUMMARY OF THE INVENTION

The present invention relates to a spray boom assembly and control system therefor and, more particularly, to such boom assembly and control system for use with spray booms which are vehicle mounted.

Spray boom assemblies have been employed in the past which have been mounted for transport on tank vehicle for the spreading of liquids along a substantially wide path in the direction of movement of the vehicle. Such spray boom assemblies are frequently capable of being moved between a rigged in position for transport and a rigged out or extended position for spraying operation.

An example of such vehicle mounted spray boom assembly is shown in one of the present co-inventors U.S. Pat. No. 3,887,132. As disclosed in that Letters Patent, a single hydraulic cylinder may be employed for rigging in and rigging out the spray boom and also for elevating the spray boom as desired upon rig in. A shock absorber cylinder is also shown in said Letters Patent extending between the movable and fixed portions of the spray boom assemblies to dampen shocks due to vertical movement of the spray boom when the boom has been rigged out and the vehicle is moving.

The present invention is a substantial improvement in the spray boom assembly disclosed in said Letters Patent.

In one improved feature of the present invention, a breakaway construction prevents accidental damage to the rigged out booms in the event that collision occurs between a boom and a fixed obstacle, e.g. fence post, stump or the earth in a terraced field. In the present invention, not only is the boom capable of giving or breaking away to prevent damage to the boom, but the boom is automatically returned after the obstacle has cleared and the shock imparted to the boom assembly upon return is simply, inexpensively and rapidly dissipated.

In another improved feature of the present invention, additional means for tilting the boom upwardly once it has been rigged out enables operation of the boom assembly on terraced terrain without the tip of the boom assembly striking a higher elevation portion of the terrain as the vehicle moves. Such additional tilting is easily and inexpensively accomplished in the present invention without further manual action by the operator following rigging out of the boom.

In still another improved feature of the present invention along with the aforementioned features a pressurized fluid circuit and check valve assembly which is capable of substantially more sensitive damping of vertical movements of the booms during operation is provided.

In one principal aspect of the present invention, a spray boom assembly which is mountable on a vehicle for movement with the vehicle includes a boom and shock absorbing means for absorbing shock imparted to the boom assembly in a direction substantially parallel to the direction of movement of the vehicle, the shock absorbing means lifting the boom in a direction substantially perpendicular to the direction of the shock in response to the occurrence of the shock to dissipate the shock.

In still another aspect of the present invention, the shock absorbing means as previously set forth includes a first piston means coupled to the boom and operative to move a boom of the assembly in a plane substantially parallel to the direction of movement of the vehicle. Second piston means is also coupled to the boom and is operative to move the boom in a direction substantially perpendicular to the last mentioned plane. Fluid circuit means communicates these piston means. The first piston means moves in response to the shock imparted to the boom assembly to force liquid through the circuit means to the second piston means to move the boom upwardly to dissipate the shock.

In still another aspect of the present invention, the boom assembly includes hinge means to allow at least a portion of the boom to rotate from a first normal position, in which a portion of the boom extends substantially perpendicular to the direction of movement of the vehicle, to a second breakaway position in which the boom extends rearward of the vehicle upon striking an obstacle. Return means returns the boom portion of the first normal position when the boom portion has cleared the obstacle. Shock absorbing means absorbs the shock imparted to the boom assembly when the boom portion is returning to the first normal position by tilting the boom.

In still another aspect of the present invention, piston means and fluid circuit means are provided for absorbing shock due to movement of a boom in a direction perpendicular to the direction of movement of the vehicle. The latter fluid circuit means includes pressurizing means for maintaining the fluid in the circuit means at a pressure in excess of atmospheric pressure and check means provides substantially unrestricted flow of the pressurized fluid from the piston means upon upward movement of the boom and restricted flow of fluid from the piston means upon downward movement of the boom.

In still another aspect of the present invention, a boom assembly control system for moving a vehicle mounted boom between a rigged in and a rigged out position and for tilting the boom when it is in the rigged out position, includes first piston means for moving the boom between the rigged out and rigged in positions, second piston means for tilting the boom, a source of pressurized fluid, and control valve means for communicating the presurized fluid with the first and second piston means. The improvement in such control system includes at least one movable port in the control valve means and circuit means which communicates the port with both the first and second piston means and each of these piston means with each other to cause the first piston means to swing the boom from the rigged in to the rigged out position and the second piston means to tilt the boom without further movement of the control valve means port when the first piston means has fully rigged out the boom.

These and other objects, features and advantages of the present invention will become clear upon consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

Figures 1, 2:
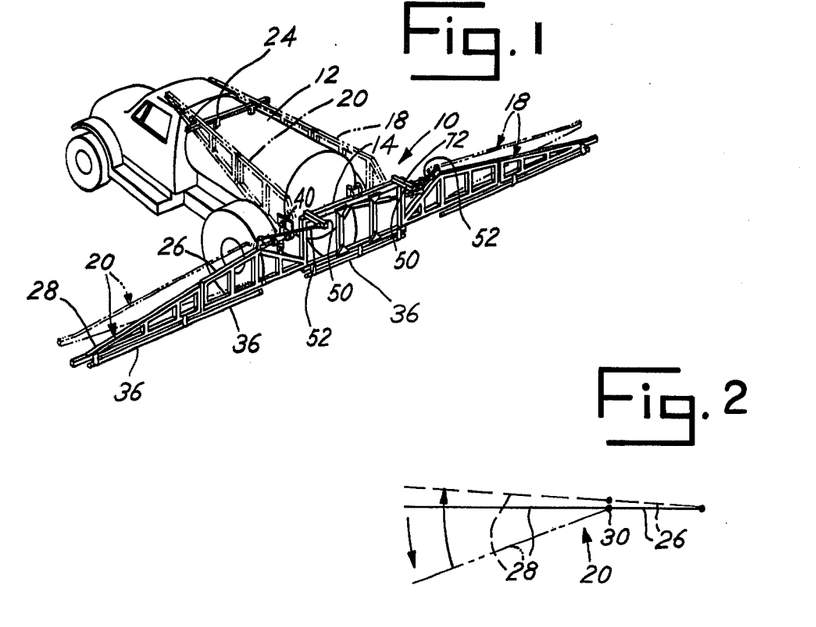
FIG. 1 is a perspective view of a preferred embodiment of spray boom assembly of the present invention which is mounted on a tank truck and in which the spray booms are shown in both the rigged out and rigged in conditions and in the tilted condition and/or in the process of absorbing shock in accordance with the principles of the present invention.
FIG. 2 is a diagrammatic plan view of one of the spray booms showing one of the booms in its normal, rigged out condition, in its breakaway condition, and in the condition in which the boom is returning from the breakaway condition to the normal position.
Figures 4, 5:
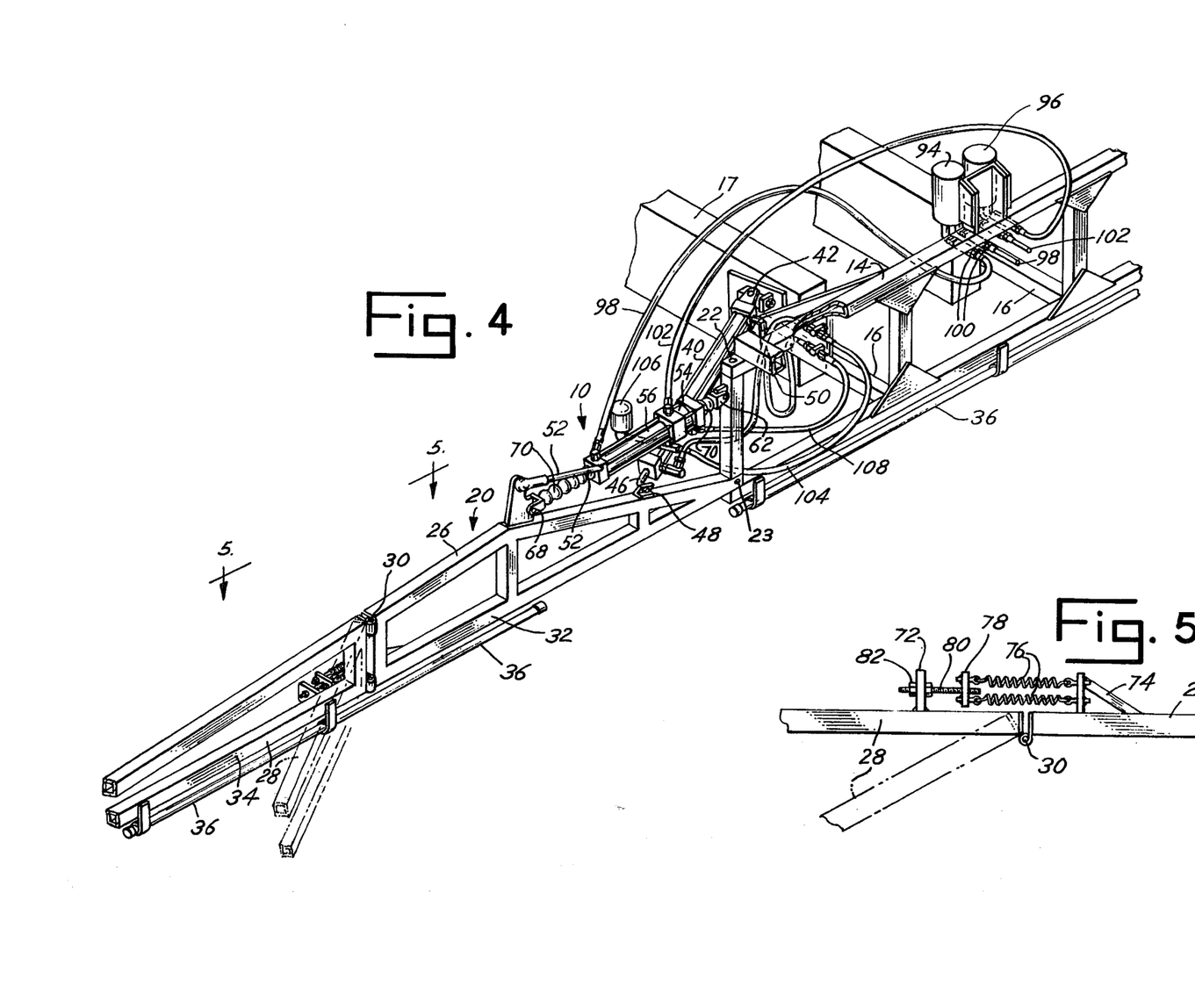
FIG 4 is a perspective enlarged view of one of the spray boom shown in FIG. 1 with portions thereof broken away to show certain features of the present invention.
FIG. 5 is an enlarged, broken plan view of a portion of one of the spray booms as viewed along line 5—5 in FIG. 4.

In FIG. 1, a preferred embodiment of spray boom assembly 10 constructed in accordance with the principles of the present invention is shown mounted on a tank truck or vehicle 12. The spray boom assembly 10, in general, comprises three sections: a first fixed frame section 14 which is rigidly mounted by way of suitable mounting supports 16, as shown in FIG. 4, to the rear frame 17 of the tank vehicle 12, and a pair of elongate spray booms 18 and 20 rotatably mounted at the opposed ends of frame section 14 by pivot pins 22, as shown in FIG. 4. The pivot pins mount booms 18 and 20 for movement between a rigged out position, as shown in solid in FIGS. 1 and 4, and a rigged in position as shown in dot and dash in FIG. 1. When the booms 18 and 20 are rigged out, the bottom of each of the spray booms may extend substantially horizontal to the ground, as shown in solid in FIG. 1, or may be tilted upward somewhat as shown in dot and dash in FIG. 1 and as will be described further hereafter.

Upon rigging in, the boom assemblies 18 and 20 are swung towards the vehicle in a plane having a major component which is horizontal and parallel to the direction of movement of the vehicle 12. If desired, the spray booms may also be elevated upon rig in as shown in FIG. 1 and in the manner set forth in the aforementioned U.S. Pat. No. 3,887,132. In either event, the spray booms 18 and 20 are each adapted to rest in a support cradle 24 for transport. Because both of the spray booms 18 and 20 are substantially identical in construction, only boom 20 will be described in detail hereafter.

Boom 20 includes a first portion 26 which is pivotally mounted by hinge pins 22 and 23 to the fixed frame section 14 as shown in FIG. 4. The spray boom 20 also includes a second breakaway wing portion 28 which is hinged to the outer end of portion 26 by a hinge 30 to allow rotation from a normal position, as shown in solid in FIG. 2, 4 and 5, to a breakaway position as shown in dot and dash when the breakaway wing 28 strikes an obstacle, such as a fence post, stump or the earth's surface.

Attached to the bottom beam 34 of the breakaway wing portion 28 and to the frame section 14 are spray pipes or conduits 36. Each of the spray conduits 36 contains a plurality of spray nozzles (not shown) and the centers of each of the spray conduits 36 are coupled to the tank of the vehicle by a suitable flexible hose (not shown) for conducting liquid from the tank to the conduits 36 and their nozzles.

A hydraulic swing cylinder 40 is coupled at one end to the vehicle frame 17, as shown in FIG. 4, by a pivot pin 42. The cylinder 40 contains a movable piston 44 and a piston rod 46 extends from the lower end of the cylinder 40 as viewed in FIG. 3. The distal end of the piston rod 46 is pivotally coupled by bracket 48 to the portion 26 of the boom, as shown in FIG. 4.

The swing cylinder 40 has the function of rigging in and rigging out the boom 20 between the position shown in solid and dot and dash in FIG. 1. Certain portions of the mechanical structure of the boom assembly for rigging in and out the boom have not been shown in detail or, in the alternative, have been broken away as these remaining mechanical elements of the swing assembly do not for a part of the present invention per se. By way of example a rigid, but pivotal arm 50 and rod 52 have only have been partially shown in FIG. 4. Reference is made to U.S. Pat. No. 3,877,132 for the remaining mechanical elements which may be utilized to effect rig out and rig in using only a single swing cylinder and for their operation.

Figure 3:
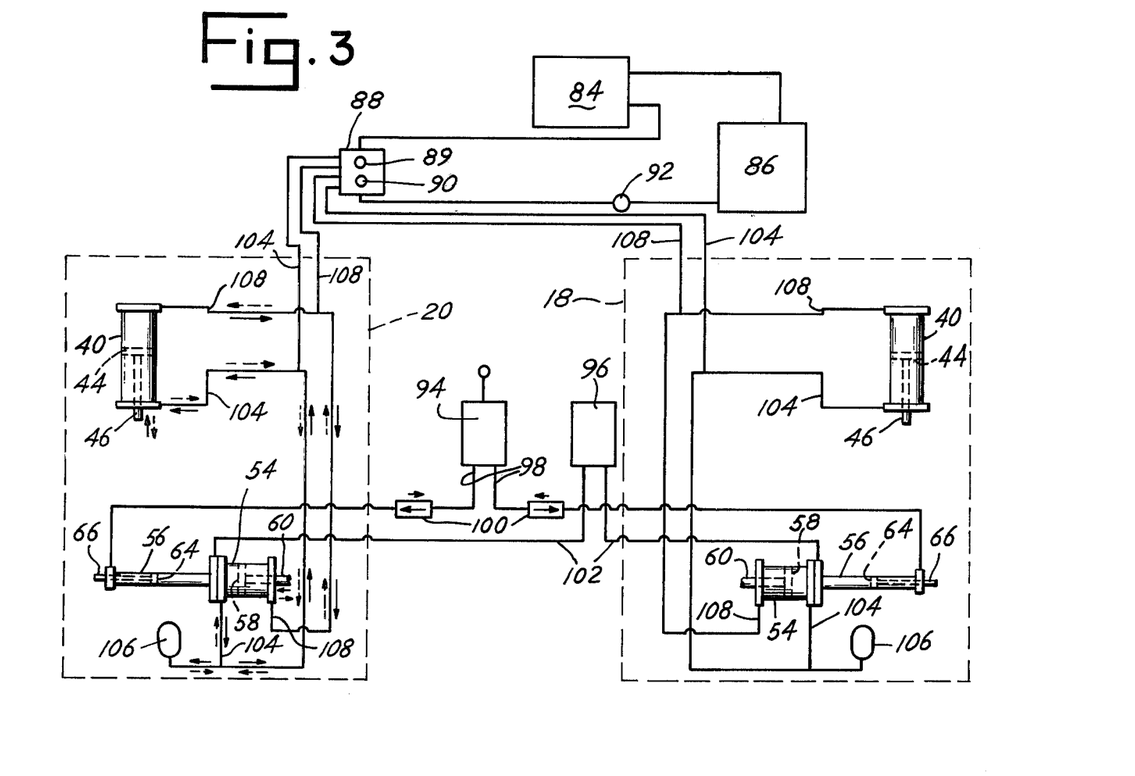
FIG. 3 is a schematic of a suitable hydraulic circuit for practicing the principles of the present invention.

A pair of hydraulic cylinders 54 and 56 are also rigidly coupled together and extend between the fixed frame section 14 of the boom assembly and portion 26 of the boom 20 as shown in FIG. 4. Referring particularly to FIGS. 3 and 4, cylinder 54, which is a tilt cylinder for tilting the boom in a vertical direction once the boom has been rigged out, includes a piston 58 having a piston rod 60 which extends from the cylinder toward the fixed frame section 14. The distal end of pistion rod is pivotally linked, by a pivotal bracket 62 as shown in FIG. 4, to the fixed frame section 14. Cylinder 56 is a shock cylinder for absorbing shock resulting from vertical or bouncing movement of the boom. It also includes a piston 64 and a piston rod 66 which is coupled, as shown in FIG. 4, by a pivotal bracket 68 to the upper side of portion 26 of boom 20. A flexible, accordian like housing 70 preferably encases each of the piston rods 60 and 66 to prevent contamination during operation from dirt and other particulate contaminants.

Prior to discussing the hydraulic circuitry for the several cylinders 40, 54 and 56, reference will first be made to FIGS. 4 and 5 in which the breakaway construction is shown. As previously mentioned, the breakaway wing portion 28 of the boom 20 is hinged by hinge 30 so as to rotate rearwardly of the vehicle in the event that an obstacle is struck during forward motion of the vehicle 12. This breakaway construction also preferably includes a rigid support bracket 72 firmly attached to one of the beams of the breakaway wing portion 28, as by welding, and a corresponding bracket 74 rigidly attached to the boom portion 26 also as by welding. Both brackets 72 and 74 extend forward to the boom in the direction of movement of the vehicle. One or more resiliant coil springs 76 extend between brackets 72 and 74. Preferably, one of the ends of the coil springs 76 are attached to a plate 78 which, in turn, is attached by a threaded bolt 80 and nuts 82 to bracket 72 to allow adjustment of the tension of the springs 76.

As shown in FIGS. 3 and 4, the preferred hydraulic system of the present invention comprises a hydraulic pump 84 which is driven by the engine of the vehicle 12 and a hydraulic reservoir 86. A double spool control valve 88 is positioned in the cab of the vehicle 12 and includes a pair of manual operating handles 89 and 90 for controlling the rigging in and rigging out operation and the tilting of booms 20 and 18, respectively. The return line to the hydraulic reservoir also preferably includes a filter 92. Each of the handles 89 and 90 controls a pair of ports (not shown), one port for leading high pressure hydraulic fluid from pump 84 to one of the swing cylinders 40 and one of the tilt cylinders 54, and the other port for receiving the return flow from these cylinders and discharging this flow back to reservoir 86.

The hydraulic circuit also includes a hydraulic pressure tank 94 and a second hydraulic reservoir tank 96 preferably mounted on the fixed frame section 14 of the vehicle as shown in FIG. 4. The latter tanks 94 and 96 do not function in the rig out and rig in operation of the present invention, but do perform a function in damping of shock due to up and down or vertical movement of the boosm 18 and 20, as will be described in more detail later. The hydraulic pressure tank 94 communicates through conduits 98 and check valves 100 with the piston rod ends of each of the shock cylinders 56 as shown in FIG. 3. The other ends of each of the shock cylinders 56, in turn, communicate with reservoir 96 by way of hydraulic conduits 102.

Check valves 100 allow substantially unrestricted flow in the direction shown by the large arrow within the valves in FIG. 3. However, the check valves 100 each include a small orifice or restriction (not shown) which allows some flow of fluid in the reverse direction even when the check valves are closed. This reverse flow is depicted by the small arrows shown in FIG. 3 just above the valves.

Still referring to FIG. 3, the piston rod end of each of the swing cylinders 40 communicate, via conduits 104, with control valve 88 and also with the non-piston rod ends of one each of the tilt cylinders 54. In addition, conduits 104 leading from their respective tilt cylinder 54, also communicate with a small expansion chamber 106. There is one expansion chamber for each boom and its tilt cylinder 54. The purpose of the expansion chambers will be described in the description of the operation of the system to follow.

The non-piston rod ends of the swing cylinders 40 communicate, via conduits 108, with the control valve 88 and with the piston rod ends of the respective tilt cylinders 54. Thus, upon considering the hydraulic circuit shown in FIG. 3, it will be understood that a swing cylinder 40 and tilt cylinder 54 of each boom 18 and 20, respectively, are connected to each other in parallel, but that the hydraulic circuit of the swing and tilt cylinders of boom 18 is independent of the cifcuit of boom 20.

THE OPERATION

Although it is believed that the operation of the boom assembly and hydraulic system of the invention will become evident upon full consideration of the preceding description, a description of the detailed operation of the above described assembly and system follows.

It will first be assumed that both booms 18 and 20 of the boom assembly are fully rigged in for transport and are resting upon the support cradle 24 as shown in the dot and dash position in FIG. 1.

After the vehicle arrives at its desired location for application of the liquid in the tank of the vehicle, the booms 18 and 20 are rigged out. To rig the booms out, control handles 89 and 90 of control valve 88, as shown in FIG. 3, are operated to port pressurized fluid from the engine driven hydraulic pump 84 to conduits 108. Control handle 89 operates boom 20 and handle 90 operates boom 18. Because rigging out of boom 18 is identical to the rigging out of boom 20, the procedure for rigging out boom 20 only will be described.

As high pressure hydraulic fluid passes through conduit 108 from the port controlled by control handle 89, it enters the swing cylinder 40 at its non-piston rod end forcing the piston 44 downward as viewed in FIG. 3 and extending the piston rod 46 from the cylinder. Extension of piston rod 46 outward of the swing cylinder 40, causes the boom 20 to swing in a plane having a component which is parallel to the direction of motion of the vehicle 12, until the boom has assumed a fully rigged out position as shown in solid in FIG. 1. In this fully rigged out position, the boom extends from the vehicle in a direction which is substantially perpendicular to the direction of motion of the vehicle. It will also be understood that operation of the swing cylinder 40 may also lower the boom 20 from its somewhat elevated rigged in position to the solid position shown in FIG. 1 as is fully described in U.S. Pat. No. 3,887,132. Hydraulic fluid which is forced from the piston rod end of swing cylinder 40 by movement of the piston 44 downward as viewed in FIG. 3 returns through conduit 104 to control valve 88 and filter 92 to the reservoir 86.

Once the boom 20 has been fully rigged out to the position shown in solid in FIG. 1, further movement of the piston 44 will stop, for example by the piston 44 coming to rest against the lower end of cylinder 40 as viewd in FIG. 3. If the terrain which is to be sprayed is flat, the operator may at this point manually return handle 89 on the control valve 88 to its neutral position. The control valve 88 is preferably spring loaded toward the neutral position so that all the operator need do is remove his hand from the handle 89 and the handle and valve automatically return to the neutral position. When the valve 88 returns to the neutral position the high pressure fluid from pump 84 is merely bypassed through the control valve back to reservoir 86 and the pump is isolated from the swing cylinder 40 and tilt cylinder 54.

However, if the terrain to be sprayed contains excessive numbers of outcropping or other obstacles or if it is terraced, the operator may prefer to tilt the end of the boom 20 upward somewhat after it is rigged out in order to avoid frequent collision of the end of the boom with the obstacles or the terraced earth. In this case the operator need only leave handle 89 of control valve 88 in the rig out position without further manipulation. In this position high pressure hydraulic fluid will continue to flow from pump 84 through conduit 108, but instead of flowing to swing cylinder 40 which has now completed its operation, it will flow to the piston rod end of the tilt cylinder 54 to force its piston 58 toward the left as viewed in FIG. 3. As piston 58 moves to the left, it will withdraw its poston rod 60 into the cylinder causing an upward tilting action of the boom 20. Once the amount of tilt desired has been placed on the boom, such as shown in dot and dash in FIG. 1, tilting may be ceased by permitting the control valve 88 to return to its neutral position. During tilting of the boom 20, the hydraulic fluid discharged from the left side of piston 58 is returned through conduit 104, through control valve 88 and filter 92 to reservoir 86.

The tilt cylinder 54 is preferably of a somewhat larger diameter than swing cylinder 40. Because of this, the tilt cylinder will remain stationary during operation of the swing cylinder until the swing cylinder has fully extended the boom. It has been found that a swing cylinder of 2½ inch diameter and tilt cylinder of 4 inch diameter produces satisfactory results.

It will be readily understood that operation is just the reverse to lower and rig in the boom 20. To lower the boom from its upward tilted rigged out position and rig in the boom, the control handle 89 on control valve 88 is moved in the other direction to port high pressure fluid through conduit 104 to the non-piston rod end of the tilt cylinder 54. This fluid forces piston 58 to the right to extend piston rod 60 to lower the boom 20 from the dot and dash position shown in FIG. 1 to the solid position. Once the boom has been lowered, the piston 58 will come to rest against the right side of the tilt cylinder 54 as shown in FIG. 3 and, without moving handle 89, high pressure fluid will then continue to flow through conduit 104, but in the piston rod end of cylinder 40. This fluid will force the piston 44 in an upward direction, as viewed in FIG. 3, to draw in the piston rod 46 and swing boom 20 to its rigged in position shown in dot and dash in FIG. 1. During this lowering movement of the piston 58 in tilt cylinder 54 and the rigging in movement of the piston 44 in swing cylinder 40, hydraulic fluid from the piston rod side of tilt cylinder 54 and non-piston rod side of the swing cylinder 40 will flow through conduit 108 to control valve 88 where it is discharged to reservoir 86.

Turning now to the description of one of the shock absorbing features of the present invention, with the boom fully rigged out and the vehicle 12 moving forward, an obstacle may lie in the path of one or both of the bonus 18 or 20. If collision occurs between one of the booms and such obstacle, substantial shock forces may be exerted on the boom and, without the breakaway feature of the present invention, could irreparably damage the boom particularly when it is considered that each of the booms may be as long as 25 feet in length.

When collosion occurs between such stationary obstacle and the breakaway wing portion 28 of the boom shown in FIGS. 1 and 4, damage is prevented to the boom because the wing portion 28 merely pivots rearwardly about hinge 30 and against the force of springs 76 causing the springs to tension. Once the wing portion 28 has cleared the obstacle, the tensed springs 76 will cause the wing 28 to swing forward so as to resume the normal wing position shown in solid in FIGS. 4 and 5.

However, even though the obstacle has now been cleared without damage to the boom, return of the outer breakaway wing portion 28 of the boom to its normal position creates a substantial shock in boom 20 which could, over a short period of time, cause substantial mechanical damage to the entire boom structure and particularly to its several couplings. The existence of such return shock as the breakaway wing portion swings back to its normal position in the direction of movement of the vehicle is evident again when considering the fact that the wing portion is positioned toward the tip of the long boom which is a substantial distance from the vehicle, and the springs 76 generally exert a substantial returning force.

Referring to the diagram in FIG. 2, return of the wing portion 28 from its breakaway condition as shown in the lower dot and dash lines to its normal position as shown by the solid line causes the entire boom 20 to tend to be jarred even beyond the normal position as shown in solid in FIG. 2 toward the upper dot and dash line position shown in FIG. 2 and in a direction substantially parallel to the direction of movement of the vehicle 12. The present invention effectively absorbs a substantial amount of this return shock and dissipates this shock by tilting the boom upwardly as will be described.

Referring again to FIG. 3, in the fully rigged out operating condition of the boom 20, the piston 44 of swing cylinder 40 will be at rest against the bottom end of the swing cylinder as viewed in FIG. 3 and the piston 58 of tilt cylinder 54 will either be at rest against the right end of the tilt cylinder, if the boom 20 has not been tilted, or somewhere in between as shown in FIG. 3. When the return shock of the returning wing portion 28 is imparted to the boom to cause it to tend to move slightly forward as shown in the fuller upper dot and dash line in FIG. 2, this forward movement will cause piston 44 of swing cylinder 40 to move somewhat upwardly as viewed in FIG. 3 and as shown by the solid arrow. Movement of piston 44 forces hdyraulic fluid contained in the non-piston rod end of the swing cylinder out of the swing cylinder through conduit 108 as shown by the solid arrows in FIG. 3. Because at this time control handle 89 on control valve 88 is in its closed or neutral position, the fluid forced from the swing cylinder 40 will continue to pass through conduit 108 and into the piston rod end of the tilt cylinder 54 moving its piston 58 to the left as viewed in FIG. 3 and as shown by the solid arrow. Movement of piston 58 will cause the entire boom 20 to tilt upwardly from wherever it was prior to the shock. Fluid discharged from the left side of piston 58 of the tilt cylinder 54 will flow, as shown by the solid arrow, through conduit 104 and back to the piston rod side of a swing cylinder 40. Whatever excess fluid cannot be accommodated in swing cylinder 40 due to the presence of piston rod 46, will flow into the expansion chamber 106.

Once this return shock has been dissipated by lifting the entire boom 20 against gravity, the entire boom automatically returns to its normal lowered position because piston 58 of the tilt cylinder 54 will again move to the right once the increased pressure subsides. The fluid from the piston rod side of piston 58 of tilt cylinder 54 will pass, as shown by the dotted arrows in FIG. 3, through conduit 108 back to the non-piston rod end of swing cylinder 40 to again force piston 44 into its lowered rest position. Thus, the boom 20 returns both to its lowered position and to its normally extending position as shown in solid in FIG. 2. As piston 58 returns to the right in tilt cylinder 54, the fluid displaced by piston 44 in the swing cylinder will pass, as shown by the dotted arrows, through conduit 104 back to the non-piston rod side of tilt cylinder 54.

In addition to the present invention absorbing the return shock of the boom caused by the return of breakaway wing 28, additional improved absorption of shock caused by vertical movement of the boom is also realized by the addition of shock cylinders 56. This vertical shock may either be the result of normal bouncing of the boom in field operation or the result of operation of the aforementioned shock system in lifting and lowering the boom to absorb breakaway return shock or both.

Most of the damaging shock due to bouncing or up and down movement of the boom 20 is the result of downward or bottoming movement of the boom, rather than upward movement of the boom. This is because upon upward movement of the boom, gravitational forces tend to reduce the shock, but on downward movement of the boom, these same gravitational forces exacerbate the shock. It has been found that a substantial improvement in the absorption of such vertical shock results by the provision of the hydraulic pressure tank 94 which is pressurized to preferably 12–15 psig together with the check valve 100 which has a small return flow orifice (not shown). The check valve 100 is designed to open to allow the flow of pressurized fluid from tank 94 in the direction of the large arrow shown on the valve, but to close and allow only a small amount of fluid through the orifice back to tank 94 in the direction of the small arrow shown above the check valve 100 in FIG. 3. When considering the circuit diagram shown in FIG. 3, it will be evident that the hydraulic circuit containing tank 94 and check valves 100 and shock cylinders 56 are independent of the circuit previously described for the swing cylinder 40 and tilt cylinder 54.

In operation of the vertical shock absorbing system and with particular reference to the system for boom 20, as the boom 20 bottoms or moves downward, the piston 64 in the shock cylinder 56 will move to the left as viewed in FIG. 3 due to the bottoming force exerted upon its piston rod 66. As the piston 64 moves to the left, the non-piston rod end of cylinder 56 will be replenished through conduit 102 from reservoir 96. However, movement of piston 64 to the left will be damped because the discharge of fluid from the piston rod end of cylinder 56 will be restricted by the closed check valve 100 and limited only to the amount of fluid which can pass through the return orifice in the closed valve. An orifice having a diameter of 1/32 inch has been found to be satisfactory.

After bottoming of the boom 20 has completed, and the over pressure to the left of check valve 100 has diminished, pressurized fluid from the pressure tank 94 will open check valve 100 to the piston rod end of cylinder 56 to return it to its normal position and the fluid from the non-piston rod end of cylinder 56 will return to the reservoir tank 96.

From the foregoing it will be readily appreciated that the boom assembly and control system of the present invention solve a number of problems without the necessity of addition of valves or other elements to the system. Indeed, boom return shock is effectively absorbed by tilting the boom through its normal swing and tilt mechanisms. Moreover, in addition to effectively absorbing return shock forces, the boom assembly and control system of the present invention also effectively absorbs shock due to up and down motions of the booms. And, in addition to these advantages, the operator is able to not only rig in and rig out the boom assembly of the present invention, but also adjust the tilt of the booms once they are rigged out without any further manual manipulation.

It will be understood that the embodiments of the present invention which have been described are merely illustrative of an application of the principles of the invention. Numerous modifications may be made by persons skilled in the art without departing from the true spirit and scope of the invention.

What is claimed is:

1. In a spray boom assembly mountable on a vehicle for movement with the vehicle,
   at least one boom,
   shock absorbing means for absorbing shock imparted to said boom assembly in a direction substantially parallel to the direction of movement of the vehicle, said shock absorbing means including fluid circuit means for converting said shock to a force pivotally lifting said boom in a direction substantially perpendicular to the direction of said shock in response to the occurrence of said shock to dissipate said shock.

2. The assembly of claim 1 wherein said fluid circuit means is hydraulic.

3. In a spray boom assembly mountable on a vehicle for movement with the vehicle,
   at least one boom,
   shock absorbing means for absorbing shock imparted to said boom assembly in a direction substantially parallel to the direction of movement of the vehicle, said shock absorbing means pivotally lifting said boom in a direction substantially perpendicular to the direction of said shock in response to the occurrence of said shock to dissipate said shock, said shock absorbing means including first piston means coupled to said boom, said first piston means being operative to move said boom in a plane substantially parallel to the direction of movement of the vehicle, and second piston means also coupled to said boom, said second piston means being operative to move said boom in a direction substantially perpendicular to said plane.

4. The assembly of claim 3 including fluid circuit means communicating said first piston means with said second piston means, said first piston means being movable in response to said shock imparted to said boom assembly to force fluid from said first piston means through said fluid circuit means to said second piston means to move said boom in said perpendicular direction to dissipate said shock.

5. The assembly of claim 4 wherein said fluid is hydraulic fluid.

6. The assembly of claim 4 wherein said fluid circuit means couples said first and second piston means in parallel to each other.

7. The assembly of claim 3 including third piston means movable with and in response to movement of said boom in a direction perpendicular to the direction of movement of the vehicle, and fluid circuit means for absorbing shock imparted to said boom assembly due to movement of said boom in said direction perpendicular to the direction of movement of the vehicle.

8. The assembly of claim 7 wherein said fluid circuit means includes
   pressurizing means for maintaining the fluid in said fluid circuit means at a pressure in excess of atmospheric pressure, and
   check means, said check means providing substantially unrestricted flow of said pressurized fluid to said third piston means upon upward movement of said boom and restricted flow of fluid from said piston means upon downward movement of said boom.

9. The boom assembly of claim 7 including second fluid circuit means communicating said first piston means with said second piston means, said first piston means being movable in response to the shock imparted to said boom assembly in the direction substantially parallel to the direction of movement of the vehicle to force fluid from said first piston means through said second fluid circuit means to said second piston means to move said boom in said perpendicular direction to dissipate said shock.

10. The assembly of claim 9 wherein said first mentioned first circuit means and said second fluid circuit means are independent of each other.

11. A boom assembly control system for moving at least one vehicle mounted boom between a rigged in and a rigged out position and for tilting the boom when it is in the rigged out position, the system including first piston means for moving said boom between the rigged out and rigged in positions, second piston means for tilting the boom, a source of pressurized fluid, and control valve means for communicating said pressurized fluid with said first and second piston means, the improvement in said control system comprising:

at leat one movable port in said control valve means,
conduit means communicating said port with both said first and second piston means and said first and second piston means with each other, said port being movable to a single position to communicate said pressurized fluid to said first piston means through said conduit means to cause said first piston means to swing the boom from the rigged in to the rigged out position and to said second piston means through said conduit means when said first piston means has fully rigged out said boom to tilt said boom without further movement of said port, and
shock absorbing means for absorbing shock imparted to the boom assembly in a direction substantially parallel to the direction of movement of the vehicle, said shock absorbing means tilting said boom in response to the occurrence of said shock to dissipate said shock, said shock absorbing means including said first and second piston means and said conduit means, said first piston means being movable in response to said shock imparted to the boom assembly to force fluid from said first piton means through said conduit means to said second piston means to tilt said boom to dissipate said shock.

12. The control system of claim 11 including
hinge means on said boom for enabling at least a portion of said boom to rotate from a first normal position in which said boom portion extends substantially perpendicular to the direction of movement of the vehicle to a second breakaway position in which said boom portion extends rearward of the vehicle upon striking an obstacle, and
return means for returning said boom portion from said second breakaway position to said first normal position when said boom has cleared the obstacle, said shock absorbing means absorbing the shock imparted to said boom assembly when said boom portion is returning to said first normal position.

13. The control system of claim 12 wherein said return means comprises spring means.

14. The assembly of claim 11 including third piston means movable with and in response to movement of said boom in a direction perpendicular to the direction of movement of the vehicle, said fluid circuit means for absorbing shock imparted to said boom assembly due to movement of said boom in said direction perpendicular to the direction of movement of the vehicle.

15. The assemblly of claim 14 wherein said last mentioned fluid circuit means includes
pressurizing means for maintaining the fluid in said last mentioned fluid circuit means at a pressure in excess of atmospheric pressure, and
check means, said check means providing substantially unrestricted flow of said pressurized fluid to said third piston means upon upward movement of said boom and restricted flow of fluid from said third piston means upon downward movement of said boom.

16. The control system of claim 15 wherein said first and last mentioned fluid circuit means are independent of each other.

17. The control system of claim 11 including fluid circuit means coupling said first and second piston means in parallel to each other.

18. In a spray boom assembly mountable on a vehicle for movement with the vehicle,
at least one boom,
shock absorbing means for absorbing shock imparted to said boom assembly in a direction substantially parallel to the direction of movement of the vehicle, said shock absorbing means lifting said boom in a direction substantially perpendicular to the direction of said shock in response to the occurrence of said shock to dissipate said shock,
hinge means, said hinge means allowing at least a portion of said boom to rotate from a first normal position in which said boom portion extends substantially perpendicular to the direction of movement of the vehicle to a second breakaway position in which said boom portion extends rearward of the vehicle upon striking an obstacle, and
spring means for returning said boom portion from said second breakaway position to said first normal position when said boom has cleared the obstacle, said shock absorbing means absorbing the shock imparted to said boom assembly when said boom portion is returning to said first normal position.

19. In a spray boom assembly mountable on a vehicle for movement with the vehicle,
at least one boom,
shock absorbing means for absorbing shock imparted to said boom assembly in a direction substantially parallel to the direction of movement of the vehicle, said shock absorbing means lifting said boom in a direction substantially perpendicular to the direction of said shock in response to the occurrence of said shock to dissipate said shock,
piston means movable with and in response to movement of said boom in a direction perpendicular to the direction of movement of the vehicle,
fluid circuit means for absorbing shock imparted to said boom assembly due to movement of said boom in said direction perpendicular to the direction of movement of the vehicle, said fluid circuit means including
pressurizing means for maintaining the fluid in said fluid circuit means at a pressure in excess of atmospheric pressure, and
check means, said check means providing substantially unrestricted flow of said pressurized fluid to said piston means upon upward movement of said boom and restricted flow of fluid from said piston means upon downward movement of said boom.

20. In a spray boom assembly mountable on a vehicle for movement with the vehicle including at least one boom, mounting means for mounting said boom in a normal position in which said boom extends in a direction substantially perpendicular to the direction of movement of the vehicle, breakaway means allowing at least a portion of said boom to move from said normal position to a breakaway position upon striking an obstacle, and return means for returning said boom portion from said breakaway position to said normal position, wherein the improvement in said assembly comprises:
 shock absorbing means for absorbing shock imparted to said boom assembly in a direction substantially parallel to the direction of movement of the vehicle during return of said boom portion to said normal position after breakaway, said shock absorbing means including fluid circuit means for converting said shock during return to said normal position to a force to lift said boom in a direction substantially perpendicular to the direction of said shock in response to the occurrence of said shock to dissipate said shock.

21. The assembly of claim 20 wherein said shock absorbing means lifts said boom to dissipate the shock occurring when said boom has returned to said normal position after breakaway.

22. The assembly of claim 20 wherein said shock absorbing means includes
 first piston means coupled to said boom, said first piston means being operative to move said boom in a plane substantially parallel to the direction of movement of the vehicle, and
 second piston means also coupled to said boom, said second piston means being operative to move said boom in a direction substantially perpendicular to said plane.

23. The assembly of claim 20 including piston means movable with and in response to movement of said boom in a direction perpendicular to the direction of movement of the vehicle, and fluid circuit means for absorbing shock imparted to said boom assembly due to movement of said boom in said direction perpendicular to the direction of movement of the vehicle.

24. The assemmbly of claim 23 wherein said fluid circuit means includes
 pressurizing means for maintaining the fluid in said fluid circuit means at a pressure in excess of atmospheric pressure, and
 check means, said check means providing substantially unrestricted flow of said pressurized fluid to said piston means upon upward movement of said boom and restricted flow of fluid from said piston means upon downward movement of said boom.

* * * * *

UNITED STATES PATENT AND TRADEMARK OFFICE
CERTIFICATE OF CORRECTION

PATENT NO. : 4,288,034
DATED : Sep. 8, 1981
INVENTOR(S) : Widmer et al

It is certified that error appears in the above—identified patent and that said Letters Patent are hereby corrected as shown below:

In the Specification:

Col. 2, line 21: delete "of" and insert --to--.
Col. 2, line 50: delete "circuit" and insert --conduit--.
Col. 5, line 17: delete "boosm" and insert --booms--.
Col. 6, line 30: delete "viewd" and insert --viewed--.

Col. 6, line 43: delete "outcropping" and insert --outcroppings--.
Col. 7, line 32: delete "bonus" and insert --booms--.

In the Claims:

Col. 11, line 36: delete "piton" and insert --piston--.
Col. 11, line 58: delete "said" and insert --and--.
Col. 11, line 62: delete "assemblly" and insert --assembly--.
Col. 13, line 16: delete "assemblly" and insert --assembly--.

Signed and Sealed this

Eighth Day of December 1981

[SEAL]

Attest:

GERALD J. MOSSINGHOFF

Attesting Officer  Commissioner of Patents and Trademarks